United States Patent
Vukosic

[11] Patent Number: 5,929,788
[45] Date of Patent: Jul. 27, 1999

[54] WARNING BEACON

[75] Inventor: Stephen T. Vukosic, Rochester, N.Y.

[73] Assignee: Star Headlight & Lantern Co., Avon, N.Y.

[21] Appl. No.: 09/001,017

[22] Filed: Dec. 30, 1997

[51] Int. Cl.⁶ .................................................. B60Q 7/00
[52] U.S. Cl. ................. 340/908.1; 340/908; 340/471; 340/473; 340/981; 340/984; 362/297; 362/800
[58] Field of Search .................... 340/908, 468, 340/471, 473, 475, 981, 984, 908.1, 332; 362/243, 245, 296, 297, 341, 346, 347, 800, 249

[56] References Cited

U.S. PATENT DOCUMENTS

| | | | |
|---|---|---|---|
| D. 274,003 | 5/1984 | Johnson | D26/85 |
| D. 363,250 | 10/1995 | Miyatake | D10/104 |
| 2,017,716 | 10/1935 | Halvorson . | |
| 2,740,103 | 3/1956 | Gosswiller . | |
| 3,399,400 | 8/1968 | Lucka | 340/332 |
| 3,504,339 | 3/1970 | Bailey . | |
| 3,551,676 | 12/1970 | Runnels | 340/981 |
| 3,875,561 | 4/1975 | Scarpino et al. | 340/331 |
| 4,929,866 | 5/1990 | Murata et al. | 313/50 |
| 5,039,832 | 8/1991 | Polacek et al. | 362/61 |
| 5,105,347 | 4/1992 | Ruud et al. | 362/268 |
| 5,136,483 | 8/1992 | Schoniger et al. | 362/61 |
| 5,175,528 | 12/1992 | Choi et al. | 340/331 |
| 5,313,187 | 5/1994 | Choi et al. | 340/331 |
| 5,313,188 | 5/1994 | Choi et al. | 340/331 |
| 5,428,912 | 7/1995 | Grondal et al. | 40/570 |
| 5,530,633 | 6/1996 | Yuen | 362/184 |
| 5,542,201 | 8/1996 | Grondal et al. | 40/570 |
| 5,594,433 | 1/1997 | Terlep | 340/908.1 |
| 5,608,290 | 3/1997 | Hutchisson et al. | 315/200 A |
| 5,642,933 | 7/1997 | Hitora | 362/243 |
| 5,694,112 | 12/1997 | VannRox et al. | 340/472 |

*Primary Examiner*—Jeffery A. Hofsass
*Assistant Examiner*—Julie Lieu
*Attorney, Agent, or Firm*—M. LuKacher; K. LuKacher

[57] ABSTRACT

A warning beacon or a light where clusters of LED are mounted on a circuit board and emit light into a conical reflector so as to provide omni directional illumination has improved illumination intensity over its pattern of illumination by utilizing separate reflective sections each of which is preferably parabolic. Separate clusters of LEDs (light emitting devices) are arranged along circular paths (in rings) of diameter commensurate with the diameter of each section of the reflector aimed at approximately the middle thereof. The illumination is deflected radially outward from each section. The total number of LEDs which provide the illumination is increased over other arrangements thereby enhancing the brightness or intensity of illumination provided by the beacon.

12 Claims, 2 Drawing Sheets

WARNING BEACON

The present invention relates to warning lamps which provide warning beacons to provide a visual indication of danger or other condition requiring attention in an area guarded by the beacon.

The invention enables bright visual indications to be obtained utilizing LEDs (light emitting diodes) by utilizing optics which increase the number of LEDs which are utilized to generate the illumination and directing the illumination in a manner which does not derogate or fail to utilize the illumination intensity made available by the LEDs.

Warning lamps or beacons are used wherever visual indications or visual signals are needed for warning of dangerous conditions, for example, to advise personnel in manufacturing and process facilities when an operation or machine is starting or stopping, and to signal malfunctions in equipment, such as assembly line jams. Such beacons can also warn personnel that they are entering a restricted area or an area of high danger. It is desirable to provide a high light output which is directed in a pattern effective to provide the warning indication.

It is also desirable to use light emitting diodes which provide long life steady on illumination and can readily be operated as flashing beacons.

Although LEDs of light output suitable for warning beacons, especially the so-called super luminescent or high intensity LEDs have been suggested for use in warning lamps and beacons, the imperative for maximizing light output in a limited space remains to be fully satisfied. The present invention provides an optical arrangement whereby the number of LEDs effective in providing light output, especially in the form of an omni directional beacon without moving parts, is obtained by providing an arrangement which increases the number of LEDs which may be installed and are effective in providing the light output from the beacon.

Accordingly, it is the principal object of the present invention to provide improved warning lamps or beacons wherein the illumination is provided by LEDs.

It is another object of the present invention to provide a warning lamp or beacon which is suitable for installation and industrial environments so as to provide bright visual illumination and visual signaling.

Briefly described, a warning lamp or beacon embodying the invention utilizes a reflector having first and second surfaces. Preferably, the reflector is generally conical and the first and second surfaces are parabolic annuluses in smaller and larger sections of a conical reflecting body, which sections are adjacent to each other. Clusters of LEDs are provided for each section of the reflector. Each of these clusters has a plurality of LEDs and each is arranged in a circular path preferably on a plate or printed circuit board mounted on the reflector facing the reflective surface thereof. The clusters each have a plurality of LEDs and the LEDs are arranged in rings of diameter corresponding to the diameter at approximately the midpoint of the surfaces. Beams from the LEDs are aimed, preferably centrally of the sections, and project along the axis of the reflector and are deflected radially into omni directional patterns which can merge outwardly from the reflector. The use of a plurality of reflecting sections and a plurality of clusters, preferably in rings, allows the number of LEDs to be made available to provide the light output from the beacon in the omni directional pattern to be maximized. The conical body, LED mounting plate and a cover which is transmissive of the illuminations is assembled to provide an enclosure which may be mounted wherever warning beacons are needed. The board mounting the clusters has an upper surface facing away from the reflector on which another LED cluster can be mounted and which can extend the illumination pattern above the reflector, if desired. The number of LEDs which are installed in each ring can depend upon the brightness which is desired from the warning beacon.

The foregoing and other objects, features and advantages of the invention will become more apparent from a reading of the following description in connection with the accompanying drawings in which.

Figure 1:
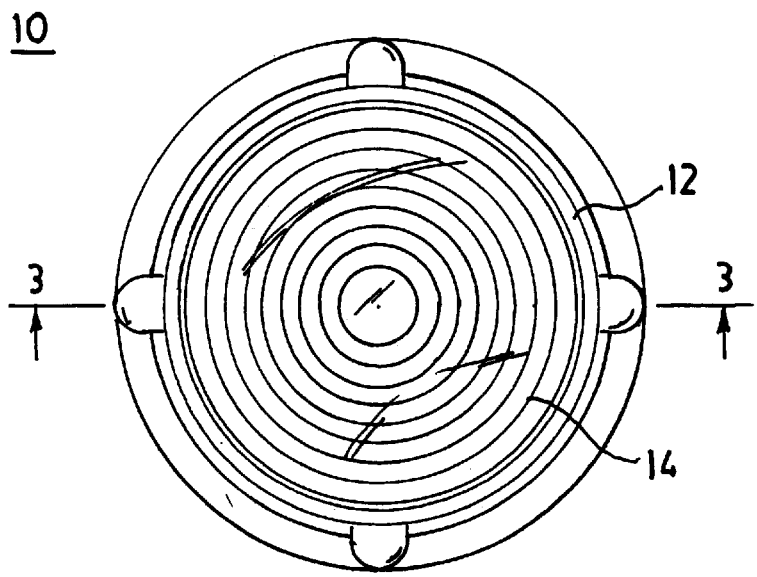
FIG. 1 is a plan view of a warning beacon embodying the invention.
Figure 2:
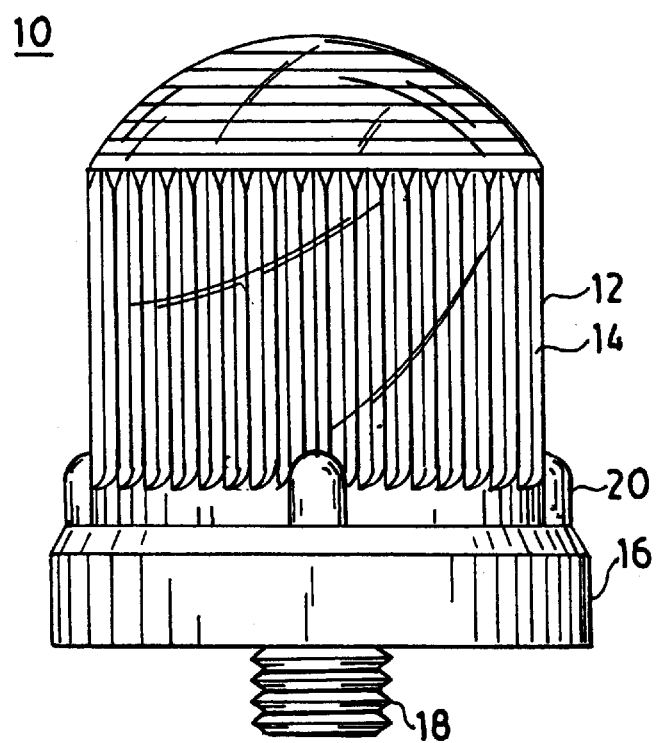
FIG. 2 is an elevational view of the beacon shown in FIG. 1.
Figure 3:
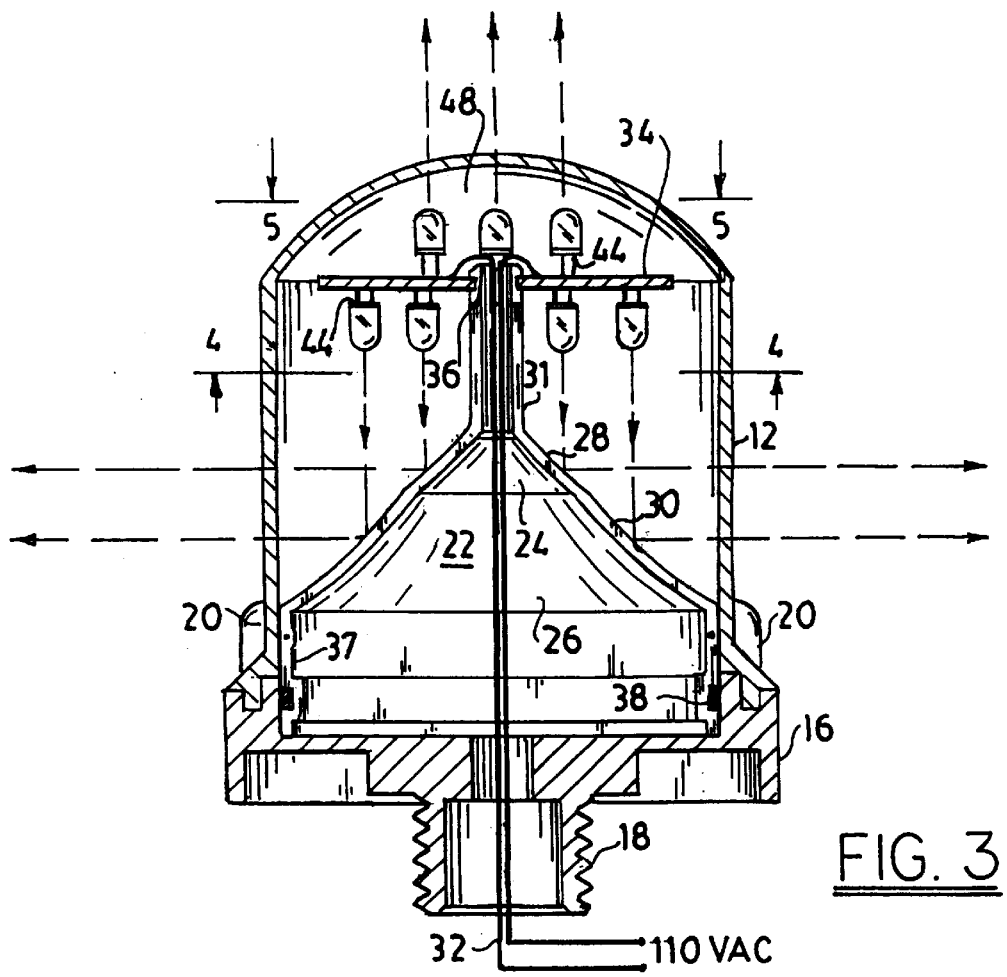
Figure 4:
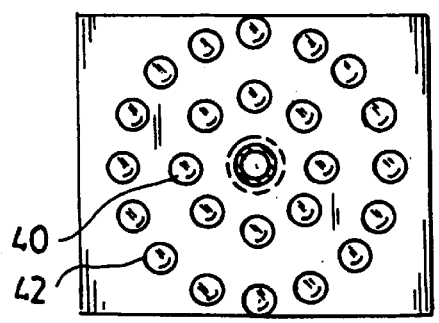
Figure 5:
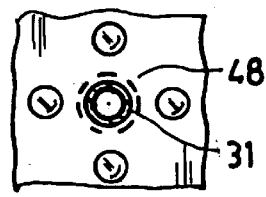

FIG. 3 is a vertical cross-sectional view taken generally along the line 3—3 in FIG. 1; and FIGS. 4 and 5 are generally horizontal plan views, respectfully taken along the lines 4—4 and 5—5 in FIG. 3.

Referring to the drawings, there is shown a warning lamp or beacon 10 having a cup-shape cover 12. The cover is striated by grooves 14 on its side and top surfaces. The cover may be assembled to a base 16 from which a threaded pipe 18 extends for installation of the beacon on a post or stanchion. The cover is made of transmissive material and may be available in colors such as amber, green and red to provide visual indications in color, if desired. The cover 12 may be plastic such as polycarbonate. The base 16 may also be of plastic material or of metal and has features 20 through which screws (not shown) may be inserted to connect the base 16 and the cover 12.

Inside the cover and disposed in interlocking relationship with the cover 12 and the base 16, is a generally conical body or cone 22. The cone has first and second sections 24 and 26, the sides of which are parabolically curved to provide annular surfaces which are radially symmetric about the axis of the body 22. The sections have surfaces 28 and 30 which are parabolic. The conical body also has a neck 31 and is hollow or tubular so as to provide an opening via which leads 32 for electrical power can be extended to a plate in the form of a circuit board 34, which is mounted as by being snapped into a circular groove 36 near the top of the neck 31. The outer surface of the conical body 22 below the reflective sections 28 and 30 is generally cylindrical on the exterior thereof and has a groove 38 in which an O-ring seal may be inserted. When assembled with the cover 12 and base 16, a locking set screw may be inserted through the side of the cover or through the base 16 into the cylindrical lower part 37 of the conical body 22.

The circuit board 34 has inner and outer clusters 40 and 42 of LEDs. The inner cluster is shown as having eight LEDs arranged along the circular path or ring while the cluster 42 has 16 LEDs also arranged along the circular path or ring. It will be appreciated that fewer or more LEDs may be arranged in each ring depending upon the brightness required by the beacon 10. The diameter of the inner cluster 42 is approximately equal to the diameter at the center of the upper reflector where the beams from the LEDs are aimed. Similarly, the diameter of the outer ring 42 is equal to the diameter of the lower section 30 of the reflector. The corresponding diameters enable the light beams projected by each LED to be efficiently collected by their respective reflectors so as to deflect the beams outwardly generally perpendicular to the axis of the cone. The beams merge in the far field outwardly away from the beacon 10.

Another cluster of a plurality (four being illustrated), used in cluster 48 of LEDs which is mounted on the board 34 so as to project beams upwardly along the axis of the conical reflector. The printed circuit board 34 has wiring which enables leads 44 of the LEDs to be connected. Components, such as resistors for limiting the LED to receive rated currents (for example, 20 milliamps) may be mounted on the board 34. The component values used for limiting the current is selected depending upon the voltage which is used and whether the voltage is AC or DC. In a typical installation either 24 volts DC or 120 volts AC may be used.

It will be apparent from the dash lines in FIG. 3 where the beams are aimed to be incident on the reflective sections 28 and 30 and that an omni directional illumination pattern 360° around the axis of the conical body 22 is obtained from the reflective sections 28 and 30 using the rings 40 and 42 of LEDs. The use of the upper cluster of LEDs 48 is optional and depends on whether illumination in the upward direction is desired from the warning lamp 10.

Variations and modifications in the herein described warning lamp or beacon, within the scope of the invention, will undoubtedly suggest themselves to those skilled in the art. Accordingly, the foregoing description should be taken as illustrative and not in a limiting sense.

I claim:

1. A warning beacon comprising a reflector having first and second surfaces, first and second clusters each having a plurality of LEDs projecting light beams, said LEDS of said first cluster being opposed to said first surface such that said beams from said first cluster are incident upon said first surface which deflects said beams outwardly from said first surface to provide a part of warning illumination from said beacon, said LEDs of said second cluster being opposed to said second surface so that said beams from said second cluster are incident on said second surface and deflected therefrom to provide another part of said warning illumination from said second surface, said first and second clusters are of smaller and greater diameter and said first and second surfaces are parts of an outwardly flaring generally conical surface.

2. The warning beacon according to claim 1 wherein said first and second surfaces are parabolic and deflect said beams outwardly from said beacon.

3. The warning beacon according to claim 1 wherein said first and second surfaces are annular and said first and second clusters are separate rings of said LEDs.

4. The warning beacon according to claim 1 wherein said first and second surfaces are annular surfaces which are parts of a generally conical surface.

5. The warning beacon according to claim 1 wherein said first and second clusters each contain a plurality of said LEDs disposed along a generally circular path concentric with said axis and of smaller and greater diameter.

6. The warning beacon according to claim 1 wherein said first and second surfaces are parabolic to project said illumination in a generally omni directional pattern perpendicularly with respect to said axis.

7. The warning beacon according to claim 6 further comprising wiring for applying power to said LEDs extending to said plate via a path internally of said body and through its said neck.

8. The warning beacon according to claim 6 further comprising another cluster of LEDs arranged on a side of said plate opposite to said side facing said surfaces and from which beams project in a direction opposite from said beams which are incident upon said first and second surfaces.

9. The warning beacon according to claim 8 further comprising a base to which said body and said cover are connected in assembled relationship enclosing said body, plate and LED clusters.

10. The warning beacon according to claim 6 further comprising a cup-shape optically transmissive cover over and around said conical body and said plate.

11. A warning beacon comprising a reflector having a first and a second surface, first and second clusters each having a plurality of LEDs projecting light beams, said LEDs of said first cluster being opposed to said first surface such that the beams from said first cluster are incident upon first surface which deflects said beams outwardly from said first surface to provide a part of warning illumination from said beacon, said LEDs of said second cluster being opposed to said second surface such that the beams from said second cluster are incident on said second surface and deflected therefrom to provide another part of said warning illumination from said second surface, said first and second surfaces are surfaces of revolution about an axis and are spaced axially and are of different radial size, said beams project to incidence upon said surfaces in the same direction along said axis and are deflected radially outward from said axis.

12. The warning beacon according to claim 11 further comprising a generally conical tubular body having an exterior surface providing said first and second surfaces and also having a neck, a plate mounted on said neck and carrying said first and second clusters in the form of said LEDs arranged along generally circular paths around said axis on the side of said plate facing said first and second surfaces, the diameter of said circular paths corresponding to the diameters of said surfaces centrally thereof, generally central rays of said beam are incident generally at points around said surfaces at the centers thereof.

\* \* \* \* \*